May 5, 1959 A. G. LOOFBOURROW 2,884,802
TRANSMISSION GEARSHIFT CONTROL MECHANISM
Filed July 7, 1954 3 Sheets-Sheet 1

INVENTOR.
Alan G. Loofbourrow.
BY
Harris and Harris
ATTORNEYS.

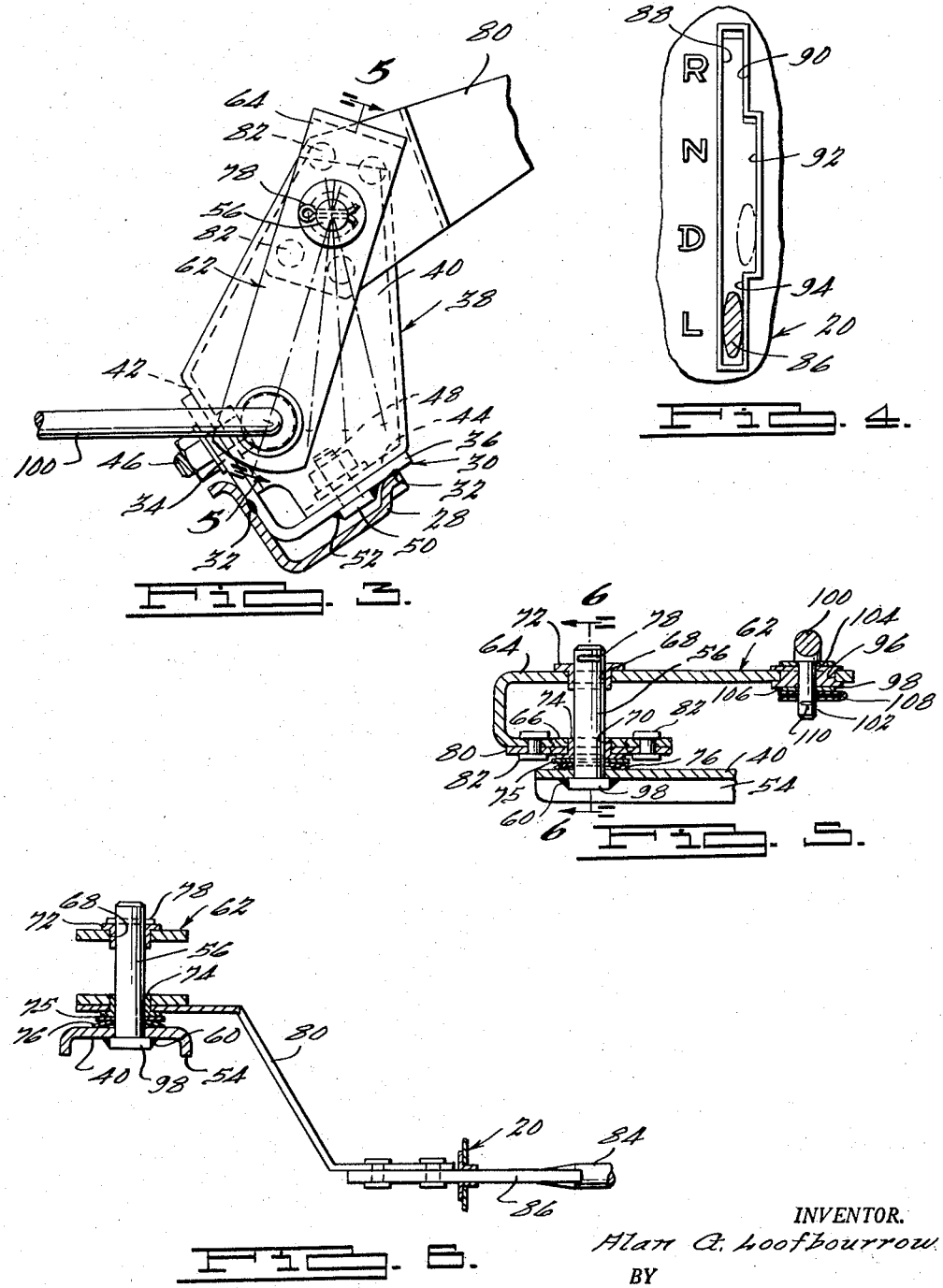

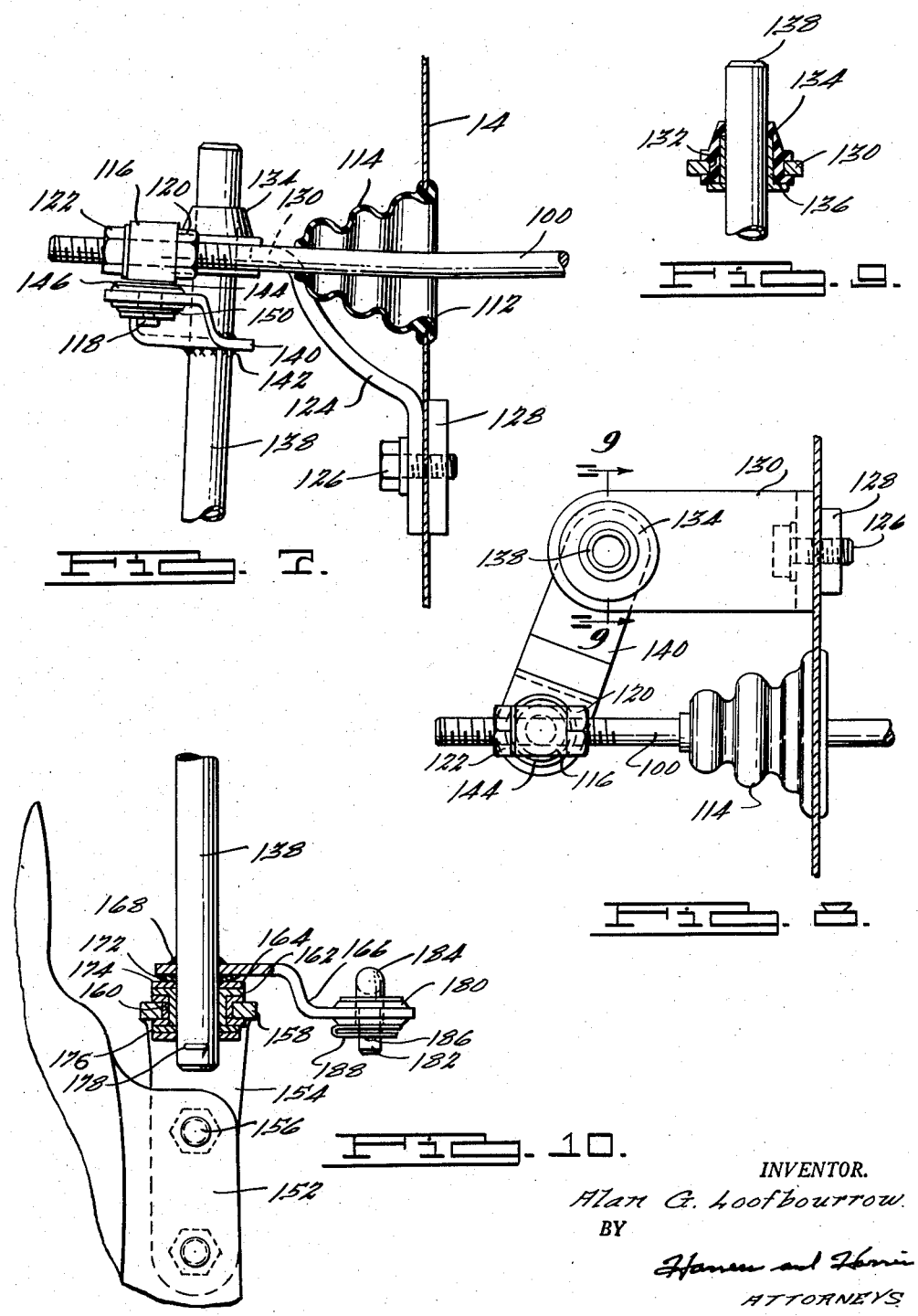

United States Patent Office 2,884,802
Patented May 5, 1959

2,884,802

TRANSMISSION GEARSHIFT CONTROL MECHANISM

Alan G. Loofbourrow, Bloomfield Hills, Mich., assignor to Chrysler Corporation, Highland Park, Mich., a corporation of Delaware Application July 7, 1954, Serial No. 441,905

8 Claims. (Cl. 74—473)

My present invention relates generally to remote control linkage mechanisms and more particularly to new and improved gearshift mechanisms for use with multiple speed power transmissions.

The mechanism of my instant invention is particularly adapted to be used with automatic, multiple speed, vehicle transmissions to effect a shift from one transmission ratio to another during the operation of the vehicle, and to thereby adapt the vehicle power train to meet various vehicle operating requirements. However, it will become apparent that the mechanism is also capable of many other uses and is not restricted in use to an adaptation of the type herein described.

The use of semi and fully automatic, multiple speed power transmissions in automotive vehicles to provide a power train between the vehicle engine and the vehicle driving wheels has become increasingly more common in the automotive art. Such transmissions are adapted to automatically provide a plurality of speed reduction ratios or an infinitely variable speed reduction ratio in the power train. Changes in the reduction ratios may be effected in response to variations in certain of the operating parameters of the vehicle or vehicle engine, such as engine speed or engine manifold pressure. An adjustable shift control element, such as the movable valve element of a hydraulic shift control valve unit, may be provided for initiating a change or shift in the speed range within which a plurality of such reduction ratios may be automatically obtained, and a suitable manually actuated lever assembly is usually provided for moving the adjustable control element to select the desired speed range.

Such a manually actuated lever assembly is normally comprised of a shift column which extends substantially parallel to and is supported by the steering wheel post found in conventional automobiles. A suitable manual shift lever is normally mounted below the vehicle steering wheel and is operatively joined to the above mentioned shift column to provide for a manual actuation of the latter and to thereby effect a shifting movement of the transmission shift control element.

Gearshift assemblies of the general type above referred to are also used with manually controlled, multiple speed, automotive transmissions, and since relatively large forces are required to effect a manual shifting movement of the transmission gear elements of manually controlled transmissions and distinguishable from the above-described automatic transmissions, the component elements of the gearshift assemblies of the type above described are necessarily very rigidly and sturdily constructed.

Further, since a compound motion is required by the portion of the shift mechanism which operatively engages the transmission gear elements of a manually controlled transmission, both an oscillating movement and a longitudinal reciprocating movement of the above mentioned shifting column is required. Therefore, these gearshift assemblies have heretofore been designed so that this compound motion may be readily obtained when the assemblies are used with such manually controlled transmissions.

By way of contrast with the design requirements of a gearshift mechanism for a manually controlled transmission, the loads which must be transmitted by gear shifting mechanisms for semi or fully automatic, automotive vehicle transmissions are relatively slight since the gearshift control element for such a transmission merely consists of a movable valve element or the like. Further, the operative movement required by the shift control element is a simple sliding movement, and therefore the shift control mechanism for such automatic transmissions need not be adapted to provide for a compound movement of the type referred to above. Also, since the shift control mechanism need only be infrequently actuated by the vehicle operator to effect a change in the speed range of the transmission assembly, the shifts in gear ratio within any given speed range occurring automatically, there is no particular advantage in mounting the gearshift lever on the steering wheel post below the steering wheel as was previously the practice.

In addition to the above noted objections to using the same type of gearshift mechanism for both types of transmissions, the use of a conventional type of gearshift lever and gearshift control mechanism with an automatic transmission of the type described is also objectionable for the reason that they require considerable space in the vehicle passenger compartment, and also because they are cumbersome and offer considerable inconvenience in operation.

Accordingly, it is a primary object of my present invention to provide a new and improved gear shifting mechanism which is particularly adapted to be used with automatic transmissions to actuate the movable control valve element thereof, as above described, and which is characterized by a unique principle of operation.

Another object of my present invention is to provide a new and improved transmission gear shifting mechanism for use with automotive vehicles which comprises a manual movable shift lever disposed within the passenger compartment of the vehicle in a convenient location, said shift lever being easily accessible to the vehicle operator and situated so as to require a minimum of space during the actuation of the same.

Another object of my present invention is to provide a transmission gearshift control mechanism for use with an automatic, multiple speed, automatic transmission, said transmission being situated near the lower portion of the associated vehicle body and operatively assembled to the vehicle engine, wherein a manually actuated shift lever portion of the mechanism may be conveniently controlled from within the interior of the vehicle body and wherein a substantially vertical shaft portion of the mechanism is supported near one end thereof by the vehicle engine, said shaft being operatively connected at vertically spaced locations to said shift lever and to a movable shift control element for the transmission, respectively.

Another object of my present invention is to provide a shift control mechanism as set forth in the preceding object wherein the manual shift lever is adapted to assume any of several operative positions and wherein means are provided for preventing an inadvertent shifting movement of the shift lever from one operating position to another.

Another object of the present invention is to provide a shift control mechanism as set forth in the preceding objects wherein the operative connection between the vertically disposed shift and said shift lever includes an adjusting means for adjustably positioning the shift lever with respect to a relatively stationary position indicator for the shift lever.

Another object of the present invention is to provide a shift control mechanism for use with an automotive vehicle wherein a portion of the mechanism is supported by the vehicle engine as set forth above, and wherein means are provided for compensating for vehicle engine vibrations to prevent undesirable forced vibrations from being delivered through the shift control mechanism to the vehicle body.

Other objects and advantages will become apparent from the following description and the accompanying drawings.

In carrying forth the foregoing objects, I have provided a preferred embodiment of my invention with a shift lever which is adapted to extend through a suitable gate opening formed in the dash panel structure of a conventional automobile. The shift lever may be rotatably mounted below the vehicle dash panel and may be adapted to move in the gate opening to a desired operating position, the associated gate structure being effective to prevent the movement of the shift lever from one operative position to another except when it is actuated by the vehicle operator.

The shift lever is operatively connected to other linkage elements of the gearshift mechanism, said elements by preference including a substantially vertical shaft which may be mounted within the vehicle engine compartment and adapted to be rotated upon movement of the shift lever. The lower end of the shaft may be positively linked to the transmission shift control element.

The vertical shaft is supported at its upper end by a bracket secured to a portion of the vehicle body and is supported at its lower end by a bracket secured to the engine and transmission assembly. The upper bracket is provided with a bushing which slidably receives the upper end of the shaft, said bushing being adapted to accommodate a relative sliding motion of the shaft and to thereby compensate for vibrations caused by the vehicle engine.

To provide for an adjustable connection between the upper portion of the shaft and the linkage element connecting the shaft and the shift lever, an adaptor is received on the end of said connecting limiting element and a finger element is integrally secured to the adaptor. The finger element is received in an opening formed at one end of an arm integrally secured to the upper end of the shaft and when the adaptor is moved with the connecting linkage element, the shaft and the integral arm are caused to rotate. The adaptor may be adjustably positioned on the connecting linkage element by a pair of nuts threadably secured on the connecting linkage element and positioned on either side of the adaptor.

Suitable rubber inserts may be provided at the connections between each of the elements of the mechanism to eliminate metal-to-metal contact and to further reduce noise and vibration.

Having thus briefly described certain of the principal features of a preferred embodiment of my instant invention, a more particular description of the same will now be made with reference to the accompanying drawings wherein:

Figure 3 is an elevation view of a portion of a shift control lever rotatably mounted within the vehicle passenger compartment;

Figure 4 is a view taken along the line 4—4 of Figure 1 showing the gate structure on the vehicle dash;

Figure 5 is a cross sectional view taken along section line 5—5 of Figure 3;

Figure 6 is a sectional view taken along the section line 6—6 of Figure 5;

Figure 7 is a partial elevation view of a vertically situated shaft element of the shift control mechanism;

Figure 8 is a plan view of the structure shown in Figure 7;

Figure 9 is a partial cross sectional view of the above mentioned shaft element taken along section line 9—9 of Figure 8; and Figure 10 is a partial sectional view showing the lower portion of the shift control mechanism and is taken along section line 10—10 of Figure 2.

Figure 1:
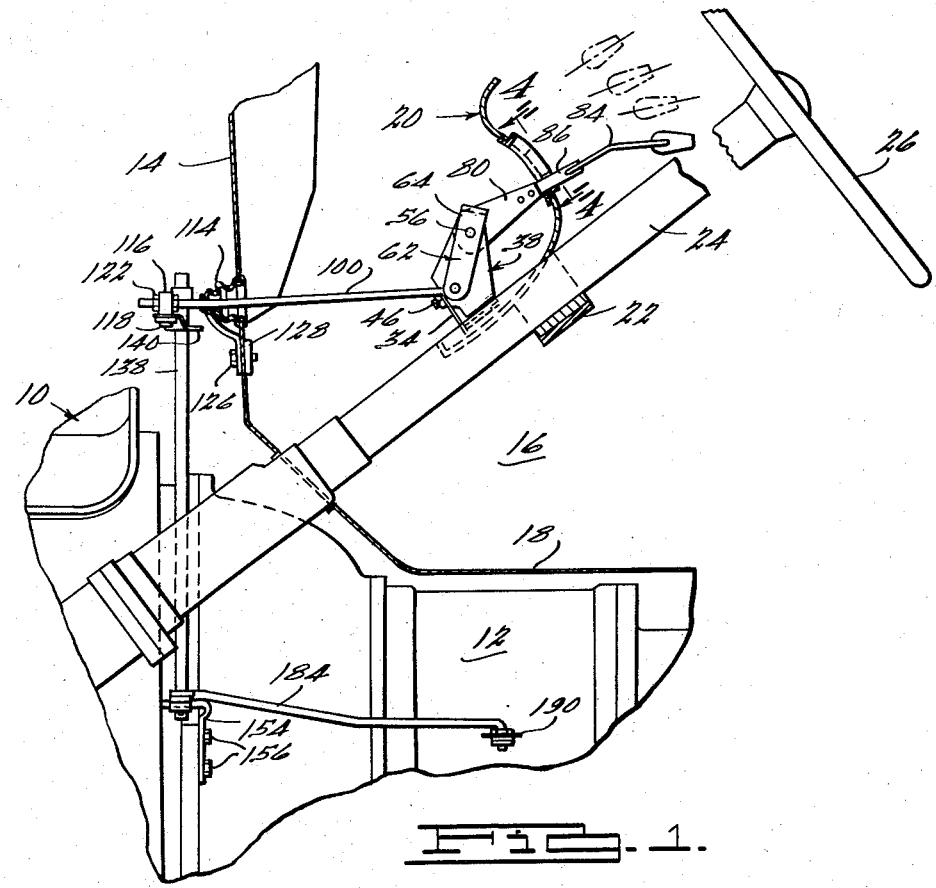
Figure 1 is an assembly view showing the gearshift control mechanism of my instant invention operatively installed in a conventional automotive vehicle.
Figure 2:
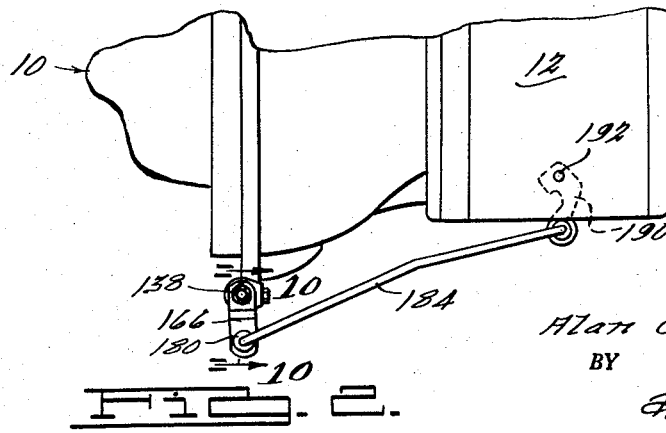
Figure 2 is a plan view of a portion of the gearshift control mechanism showing the means for connecting the same to the vehicle transmission shift control element.

Referring first to Figure 1, a portion of the vehicle engine is designated by numeral 10 and the transmission assembly is generally designated by numeral 12. The engine 10 is situated forward of the vehicle fire wall 14 and the engine compartment of the automotive vehicle, said fire wall forming a portion of the vehicle body structure which defines the vehicle passenger compartment generally designated by numeral 16. The transmission 12 is situated below the floor structure 18 of the vehicle body, as shown.

A vehicle dash panel structure 20 extends transversely across the vehicle body within the interior of the vehicle passenger compartment and is adapted to provide a suitable support 22 for a steering wheel post structure 24. This structure 24 extends in a generally downward direction through the floor structure 18 of the vehicle body and it houses a steering wheel shaft which may be operatively connected to the steering linkage of the vehicle in a conventional manner. A vehicle steering wheel 26 is supported at the upper end of the steering wheel post 24 as shown.

Referring to Figure 3, the above mentioned dash structure 20 includes an angular bracket 28 which may be secured to door posts located on either side of the vehicle body, said bracket 28 being generally angular in shape, as shown. Another angular bracket 30 is situated in mating engagement with the bracket 28 and may be integrally secured thereto by spot welding, as shown at 32, or by any suitable fastening means. The bracket 30 comprises two perpendicularly disposed portions 34 and 36, the portion 36 being spaced from the adjacent side of the bracket 28.

A shift lever mounting bracket is designated in Figure 3 by numeral 38 and it includes a vertically disposed main body portion 40 and a pair of mounting flanges 42 and 44 integrally formed at the base portion thereof. The flanges 42 and 44 are adapted to be positioned against the bracket portions 34 and 36, respectively. The flange portion 42 and the bracket portion 34 may be secured together by a bolt 46 adapted to be received through aligned apertures on the flange portion 42 and the bracket portion 34. Similarly, the adjacent flange portion 44 and the bracket portion 36 may be secured together by bolt 48 which may be received through aligned apertures formed in the flange portion 44 and the bracket portion 46. The bolt 48 includes an enlarged head 50 which may be welded, as shown at 52, to permanently secure the bolt 48 within these aligned apertures. The space between the bracket portion 36 and the transversely extending bracket 28 accommodates this bolt head 50 and thus prevents interference during assembly.

As best seen in Figures 3 and 5, the body portion 40 of the bracket 38 is provided with a marginal flange 54 to rigidify and structurally reinforce the same. The upper portion of the bracket 40 is adapted to receive therethrough a pivot pin 56 and a head portion 58 of the pin 56 may be welded, as shown at 60, to the body portion 40 of the bracket 38.

A channel-shaped lever element is provided, as shown at 62, and is comprised of two channel side portions 64 and 66 which are apertured, as shown at 68 and 70, respectively. The apertures 68 and 70 are transversely aligned and are adapted to receive therein cylindrical bushings 72 and 74 through which the pin 56 is received. A flat washer 75 and a spring washer 76 are interposed between the bushing 70 and the body portion 40 of the bracket 38. A suitable cotter pin 78 may be provided, as shown, to maintain the lever 62 assembled upon the pin 56.

As best seen in Figures 1 and 3 through 6, a relatively thin, flexible gearshift lever element is shown at 80 and is secured to the side portion 66 of the lever element 62 by suitable rivets or other fastening means 82. The lever element 80 extends from the lever element 62 in a generally upward direction and becomes progressively narrower at the extended portions thereof. A suitable extension arm 84 is secured to the end of the lever element 80, as best seen in Figure 1, and includes a portion 86 of elongated cross section which extends through a slotted opening 88 formed in the vehicle dash panel structure 20.

This slotted opening 88 may be best seen in Figure 4 and it comprises a gate structure for regulating the movement of the portion 86 of arm 84 from one operative position to another, said gate structure including a first relatively narrow portion 90, a second relatively wide portion 92, and a third relatively narrow portion 94. The arm portion 86 may be moved from one portion of the slotted opening 88 to another to effect a manual rotation of the integral lever portion 80 about the pivot pin 56. The inherent resiliency of the lever portion 80 is effective to cause the arm portion 86 to normally engage the right side of the slotted opening 88, as viewed in Figure 4, and therefore the arm 84 must be moved manually to the left before it is possible to shift the arm portion 86 from the relatively wide portion 92 of the slotted opening 88 to either of the relatively narrow portions 90 and 94. The various operative positions of the arm 84 may be designated by suitable symbols such as R, N, D, and L on the exterior of the vehicle dash adjacent the slotted opening 88, as shown in Figure 4. Each of these operative positions correspond to different transmission speed ranges as will subsequently become more apparent.

The extended end of the side portion 64 of the lever element 62 is apertured, as shown in Figure 5, at 96 and a suitable rubber bushing 98 is adapted to be received therein. A linkage element 100 is provided with a perpendicularly disposed end portion 102 which is received through the center of the bushing 98, and suitable flat washers 104 and 106 may be received on the end portion 102 on either side of the bushing 98. A spring washer may be employed, as shown at 108, and a cotter pin or other suitable fastening means 110 may be provided, as shown, for the purpose of maintaining the washers 104, 106, and 108 assembled against the bushing 98.

As best seen in Figures 1 to 7, the linkage element 100 extends in a generally forward direction and is received through an opening 112 formed in the vehicle fire wall 14 and a flexible dust cap 114 may be situated within the opening 112 for the purpose of sealing the interior of the passenger compartment 16 from the vehicle engine compartment. The terminal end of the linkage element 100 is slidably received through an adaptor 116 which is provided with an integral radially extending finger 118. A pair of adjusting nuts 120 and 122 are threadably received on the terminal end of the linkage element 100 on opposite sides of the adaptor 116. The adaptor 116 may be adjustably positioned in an axial direction on the linkage shaft 100 by suitably adjusting each of the nuts 122.

A supporting bracket member 124 is secured on the fire wall 14 in the vicinity of the vehicle engine compartment by means of one or more bolts 126 which extend through the fire wall 14 and which are threadably received in a threaded backup member 128 situated on the opposite side of the fire wall 14. The supporting bracket member 124 is provided with a substantial horizontal portion 130 and, as best seen in Figures 7 and 9, is suitably apertured at 132 to receive a rubber bushing element 134, said bushing element 134 being secured within the aperture 132 about its periphery. A nylon bushing 136 is fixed centrally within the bushing 134 and a substantially vertically extending hollow shaft 138 is slidably received therethrough.

A transversely extending arm 140 may be permanently secured by welding, as shown at 142, to the hollow shaft 138 at a position below the nylon bushing 136. The arm 140 extends in a generally transverse direction to the vicinity of the adaptor 116, the extended end thereof being apertured, as shown at 144 in Figure 8. A rubber bushing 146 is received within the aperture 144 and is secured therein about its periphery. The finger element 118 of the adaptor 116 is received through a center of the bushing 146 and a pair of flat washers 148 and 150 may be situated on either side of the bushing 146.

Referring next to Figure 10, a flange 152 extends transversely from the transmission ring gear housing and a bracket member 154 is secured thereto by means of bolts 156. The bracket member 154 is provided with a horizontally extending upper portion 158 which is provided with an aperture 160 through which a flexible bushing 162 may be secured. A steel bushing 164 may be received through the center of the flexible bushing 162 and the lower end of the hollow tube 138 is received through the bushing 164.

A transversely extending arm 166 is integrally secured to the lower portion of the hollow tube 138 by welding as shown at 168. A spring washer 170 and an adjacent flat washer 174 may be received over the end of the hollow shaft 138 and positioned between the arm 166 and the steel bushing 162. Flat washer 176 was received over the end of the hollow shaft 138 on the opposite side of the bushing 164. Each of the elements of the connection are retained in assembled relationship on the shaft 138 by a cotter pin 178.

The extended end of the arm 166 is suitably apertured to receive a flexible bushing 180 which in turn receives therethrough a perpendicularly disposed end 182 of a linkage element 184. A cotter pin 186 is provided, as shown, to retain the end 182 within the flexible bushing 180 and a spring washer 188 may be interposed between the cotter pin 186 and the bushing 180.

The linkage element 184 extends in a generally rearward direction below the vehicle body floor structure 18 and is connected at its extended end to a transmission shift control element 190 which may be operatively associated with the automatic shift control elements of the transmission and is effective to initiate a shift from one transmission speed range to another upon movement in either direction about a pivot point 192.

In operating the shift control mechanism of my instant invention, the manual shift lever arm 84 and cover portion 86 may be moved within the gate opening 88 by the vehicle operator to the desired operating position. This movement is accompanied by a reciprocating movement of the linkage element 100 and a rotary movement of the shaft 138. This rotary movement of shaft 138 effects a reciprocating movement of linkage element 184 which in turn adjusts the operating position of the shift control element 190. The position designated by the symbol D on the gate structure corresponds to the normal drive speed range for the transmission, the position designated by symbol N corresponds to neutral, the position designated by L corresponds to the low speed range and the position designated by R corresponds to the reverse speed range.

The gate structure is effective to prevent an inadvertent shifting movement of the shift lever from the drive range to low range or from neutral to reverse. To effect a shifting movement into low range or reverse, the vehicle operator must manually shift the lever arm portion 86 to the left, as viewed in Figure 4, against an opposing biasing force caused by the inherent resiliency of the arm.

The adaptor 116 may be axially adjusted on the linkage element 100 to cause the shift lever arm 84 to assume its proper operating position.

The nylon bushing 136 mounted on the bracket 124 is effective to permit a relative sliding movement between the shaft 138 and the vehicle body. This relative sliding movement compensates for vibration of the vehicle engine during operation of the same and prevents such vibration from being transmitted through the gear shift mechanism into the vehicle body. The aperture in the fire wall 14 through which the linkage element 100 extends is sufficiently large to allow for a considerable degree of displacement of the same relative to the vehicle body, said displacement accompanying the aforementioned movement of the shaft 138.

The location of the gear shift arm 84 on the dash panel structure provides for a maximum degree of convenience in operation. Further, the arm 84 requires a minimum amount of space and it may be easily situated on the dash panel of the vehicle along with the other vehicle instruments and controls.

What I claim and desire to secure by United States Letters Patent is:

1. In an automotive vehicle comprising a passenger compartment, an engine compartment, a wall structure separating said passenger and engine compartments, an engine mounted in said engine compartment, a power transmission assembled to said engine below said passenger compartment, a shift control element operatively associated with said transmission, and a vehicle dash structure transversely disposed across the interior of said passenger compartment; a transmission gear shift control mechanism comprising a manually operable lever pivotally mounted by a portion of said dash structure, a link element secured at one end thereof to a portion of said manually operable lever and extended through said wall structure, a shaft member disposed in a substantially vertical direction, a first means for rotatably supporting said shaft member at the lower end thereof, said first means having portions secured to said engine and transmission assembly, a pair of transversely extending arms secured to said shaft member at two axially spaced positions thereon respectively, the upper one of said arms being connected to the other end of said link element, a bracket member secured to said wall structure and adapted to support the upper end of said shaft member, and another link element operatively connecting the lower one of said arms to said transmission shift control mechanism, said bracket member including a means for compensating for displacement of said shaft member with respect to said dash structure due to vibration of said engine during operation.

2. In an automotive vehicle comprising a passenger compartment, an engine compartment, a wall structure separating said passenger and engine compartments, an engine mounted in said engine compartment, a power transmission assembled to said engine below said passenger compartment, a shift control element operatively associated with said transmission, and a vehicle dash structure transversely disposed across the interior of said passenger compartment; a transmission gear shift control mechanism comprising a manually operable lever, pivotally mounted by a portion of said dash structure, a shaft member disposed in a substantially vertical direction and rotatably supported at its lower end by a portion of said engine and transmission assembly, a pair of transversely extending arms secured to said shaft member at axially spaced positions thereon respectively, the upper one of said arms being linked to said manually operable lever and the lower one of said arms being linked to said transmission shift control element, and means for supporting the upper end of said shaft member comprising a bracket secured to said wall structure, an opening formed in said bracket, and a bushing secured within said opening, said shaft member being slidably retained within said bushing to compensate for displacement of said shaft member with respect to said dash structure due to vibration of said engine during operation.

3. In an automotive vehicle comprising a passenger compartment, an engine compartment, a wall structure separating said passenger and engine compartments, an engine mounted in said engine compartment, a power transmission assembled to said engine below said passenger compartment, a shift control element operatively associated with said transmission, and a vehicle dash structure transversely disposed across the interior of said passenger compartment; a transmission gear shift control mechanism comprising a manually operable lever, a bracket secured to a portion of said dash structure, said manually operable lever being pivotally mounted by said bracket, a first link element secured at one end thereof to a portion of said manually operable lever and extended through said wall structure, a shaft member disposed in a substantially vertical direction, means rotatably supporting the lower end of said shaft member and secured to said engine and transmission assembly, a pair of transversely extending arms secured to said shaft member at two axially spaced positions thereon respectively, a second link element operatively connected at one end thereof to said transmission shift control element, the upper one of said arms being coupled to said first link element and the lower one of said arms being coupled to said second link element, and supporting means secured to said wall structure for rotatably supporting the upper end of said shaft member, said supporting means enabling relative displacement between said shaft member and said wall structure to compensate for engine vibrations during operation.

4. In an automotive vehicle comprising a frame, a multiple speed power transmission mechanism and engine assembly mounted on said frame, the transmission mechanism of said assembly having a plurality of operating ranges of speed reduction ratios, a control means for selectively obtaining any of said operating ranges, and body structure supported by said frame including dash panel structure disposed within the interior of said body structure; a transmission operating range selector lever movably mounted on said dash panel structure, and linkage means including a shaft member for interconnecting said selector lever and a portion of said control means for actuating the latter, first bracket means for securing said shaft member at one location thereon to said assembly, second bracket means for securing said shaft member at another location thereon to said body structure, and means for accommodating relative movement between said shaft member and one of said bracket means to prevent engine vibrations from being transferred into said body structure through said shaft member, said one bracket means comprising a bushing secured in a relatively fixed position, said shaft member being slidable within said bushing, the latter accommodating relative movement between said body structure and said shaft member.

5. In an automotive vehicle comprising a body structure, an engine and a multiple speed power transmission assembled to said engine, said transmission including a movable shift control element and said body structure including a dash panel structure disposed transversely across the interior thereof; a transmission gear shift control mechanism comprising a manually operable shift lever, means for pivotally mounting said shift lever on said dash panel structure, a substantially vertically extending shaft member having a pair of arms secured thereto at spaced locations thereon, mounting means for rotatably supporting said shaft member to provide for rotation of said arms about the axis of said shaft member, link elements operatively connecting one of said arms with said manually operable shift lever and connecting the other of said arms with said movable shift control element, said dash panel having an elongated opening consisting of a relatively wide section and at least one relatively narrow section, said sections defining a control gate, and said manually operable shift lever extending through said elongated opening and being normally biased toward one side of said elongated opening.

6. In an automotive vehicle comprising a body structure, an engine and a multiple speed power transmission assembled to said engine, said transmission including a movable shift control element and said body structure including a dash panel structure disposed transversely across the interior thereof; a transmission gear shift control mechanism comprising a manually operable shift lever, means for pivotally mounting said shift lever on said dash panel structure including an angular bracket and a pivot pin secured to said bracket to form a cantilever fulcrum, said manually operable shift lever including a transversely apertured U shaped end portion adapted to be secured over said fulcrum and rotatably supported thereby and also including a flexible arm portion secured to said U shaped end portion, said dash panel including an elongated gate opening, said flexible arm portion being received through said gate opening, a substantially vertically extending shaft member having a pair of arms secured thereto at spaced locations thereon, mounting means for rotatably supporting said shaft member to provide for rotation of said arms about the axis of said shaft member, and link elements operatively connecting one of said arms with said U shaped end portion and connecting the other of said arms with said movable shift control element.

7. In an automotive vehicle comprising a body structure, an engine and a multiple speed power transmission assembled to said engine, said body structure including a dash panel having an elongated opening therein consisting of a relatively wide section and at least one relatively narrow section, said sections defining a control gate, a transmission gear shift control mechanism comprising a manually operable shift lever mounted on said body structure and having a portion extending through said elongated opening and being yieldably biased toward one side of said elongated opening, and gear shift linkage means operatively connecting said shift lever and transmission.

8. In an automotive vehicle a body structure, an engine and a multiple speed power transmission assembled to said engine, said body structure including a dash panel having an elongated gate opening therein, a transmission gear shift control mechanism comprising a manually operable shift lever, means for pivotally mounting said shift lever on said body structure including an angular bracket and a pivot pin secured to said bracket to form a cantilever fulcrum, said manually operable shift lever including a transversely apertured U shaped end portion adapted to be secured over said fulcrum and rotatably supported thereby and also including a flexible arm portion secured to said U shaped end portion, said flexible arm portion being received through said gate opening, and gear shift linkage means operatively connecting said U shaped end portion and transmission.

References Cited in the file of this patent
UNITED STATES PATENTS

| | | |
|---|---|---|
| 1,594,283 | Turvey | July 27, 1926 |
| 1,673,952 | Schmidt | June 19, 1928 |
| 1,688,750 | Schmidt | Oct. 23, 1928 |
| 1,788,899 | Tenney | Jan. 13, 1931 |
| 1,793,010 | Randol | Feb. 17, 1931 |
| 2,169,034 | Vanderveld | Aug. 8, 1939 |
| 2,693,712 | Koebler | Nov. 9, 1954 |
| 2,821,090 | McCordic | Jan. 28, 1958 |